United States Patent
Freiberg et al.

(10) Patent No.: US 7,106,700 B2
(45) Date of Patent: Sep. 12, 2006

(54) METHOD OF CONTROLLING QUALITY OF SERVICE OF CDMA SYSTEM USING DYNAMIC ADJUSTMENT OF PARAMETERS REPRESENTING TRANSMITTING PROPERTIES CONCERNING QUALITY OF SERVICE

(75) Inventors: Lorenz Fred Freiberg, Swindon (GB); Peter Christian Gunreben, Moehrendorf (DE); Jens Mueckenheim, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 1003 days.

(21) Appl. No.: 10/004,687

(22) Filed: Dec. 5, 2001

(65) Prior Publication Data

US 2002/0115443 A1  Aug. 22, 2002

(30) Foreign Application Priority Data

Dec. 14, 2000  (EP) .................................. 00311161

(51) Int. Cl.
*H04B 7/216* (2006.01)
*H04L 1/00* (2006.01)
*G08C 15/00* (2006.01)

(52) U.S. Cl. ...................................... 370/252; 370/335
(58) Field of Classification Search ............... None
See application file for complete search history.

(56) References Cited

U.S. PATENT DOCUMENTS

| 5,335,356 | A | * | 8/1994 | Andersson | .................. | 455/517 |
| 6,341,225 | B1 | * | 1/2002 | Blanc | .................. | 455/522 |
| 6,564,067 | B1 | * | 5/2003 | Agin | .................. | 455/522 |
| 6,904,290 | B1 | * | 6/2005 | Palenius | .................. | 455/522 |

FOREIGN PATENT DOCUMENTS

| EP | 1009174 A3 | 5/2001 |
| WO | WO98/58461 | 12/1998 |

OTHER PUBLICATIONS

XP-002161524 -Universal Mobile Telecommunications Systems 1999.
Flexible Power Allocation For Physical Control Channel in Wideband CDMA by O. Salonaho IEEE, 1999.

* cited by examiner

*Primary Examiner*—Chau Nguyen
*Assistant Examiner*—Jordan Hamann

(57) ABSTRACT

Disclosed is a method related to the controlling of quality of services of a CDMA-based-System. It is provides an improved control mechanism for the quality of services in a CDMA-System, in particular by providing a controlling means apt to assign the target signal to interference ratio, the static rate matching factor and the power-offset dynamically, especially adapted to be used for UMTS-Systems. Proposed is a dynamic quality control for adjusting quality of services of a CDMA-based System transmitting a plurality of different services between the system and a user equipment by using at least one data channel (DPDCH) with the services multiplexed and rate matching technique applied and an associated control channel (DPCCH) wherein parameters representing transmitting properties concerning the quality of service, advantageously representing a signal to interference ratio (SIR) for the control channel (DPCCH), a static rate matching factor (SRF) for each service and a power-offset (G) between the control channel (DPCCH) and the data channel (DPDCH) are derived for each service to achieve desired quality of services, during an installation process based on default quality (1, 2) requirements and during an operating condition dynamically in dependence of quality estimates (1, 5) performed on each of that services during data transmission.

19 Claims, 2 Drawing Sheets

METHOD OF CONTROLLING QUALITY OF SERVICE OF CDMA SYSTEM USING DYNAMIC ADJUSTMENT OF PARAMETERS REPRESENTING TRANSMITTING PROPERTIES CONCERNING QUALITY OF SERVICE

CROSS REFERENCE TO RELATED APPLICATION

This application claims priority of EPO application Serial Number 00311161.4 filed on 14 Dec., 2001.

1. Field of the Invention

The invention relates to a method of controlling quality of service of a CDMA-based-System and to a CDMA-based-System or Network having such a quality of service controlling functionality.

2. Background of the Related Art

As known in the art, the quality of services (QoS) in terms of a desired bit-error-ratio (BER) or block-error-ratio (BLER) within CDMA (code division multiple access) systems, as for example a mobile telecommunication network can be mainly achieved by probably adjusting the transmission power. Especially, with regard to such mobile telecommunications networks a combination of an inner loop and outer loop power control (PC) is created for systems of a second generation according to the specified IS-95 standard, wherein that power control combination works very efficiently for single voice services.

Systems of the third generation like UMTS (Universal mobile telecommunication systems) must support a variety of services with different data rates, bit-error-rates and with the multiplexing of different services. As a consequence, the systems of the third generation contain a plurality of parameters that can be adjusted to improve the performance of the system.

One of these parameters is a target signal to interference ratio (SIR) on a dedicated physical control channel. The dedicated physical control channel (DPCCH) carries, for example physical layer control information, i.e. with regard to the exemplar UMTS-system pilot symbols, transmission power control (TPC) bits and the transport format indicator (TFCI).

Since such a DPCCH is continuously transmitted, the SIR can be adjusted by the power control procedures as known in the art. Accordingly, the inner loop power control tries to keep the SIR on a constant level, whereas the outer loop power control adjusts the target SIR regarding the current service quality (BER, BLER) of each transport channel (TrCH).

A second one of these parameters is a static rate matching factor (SRF) which is used to balance the transmission power requirements of different transport channels that are multiplexed onto one code composite transport channel (CCTrCH). The static rate matching is a physical function and is also known as "$E_s/N_0$ (data bit energy to noise power density ratio)-balancing". This static rate matching function is controlled with the semi-static part of the transport format combination set (TFCS).

However, it has to be noted that the rate matching additionally comprises a dynamic rate matching function which is used in the uplink, i.e. for a data transmission from a user equipment such as a mobile station to a CDMA-network via a base transceiver station (BTS) thereof, to adapt the symbol data rate on the code composite transport channel to a symbol data rate on the dedicated physical data channel in order to preserve continuous transmission on the dedicated physical data channel (DPDCH). Since this dynamic rate matching function is an autonomous physical function it is not further described in detail in the present application description.

A third one of these parameters that can be used for improving a performance of a CDMA-System according to the third generation is the power-offset between the dedicated physical data channel (DPDCH) carrying data of dedicated channels (DCH), i.e. according to the UMTS-example either transmitted user traffic or higher layer control information, and the dedicated physical control channel. As mentioned above, the signal to inference ratio (SIR) on the dedicated physical control channel is controlled by the conventional inner- and outer loop power control procedures. However, for determining the quality of service (QoS) of each radio bearer (RB) the ratio representing the data bit energy to noise power density ($E_b/N_0$) of each transport channel multiplexed on a dedicated physical data channel is the basic parameter. As a consequence the power control procedures should control that $E_b/N_0$.

According to the 3GPP specifications (3GPP UMTS TS 25.213 "Spreading and modulation (FDD)") a power-offset factor between the dedicated physical control channel and the dedicated physical data channel is defined as being a power-offset factor "G" representing a ratio of amplitudes. The value of "G" must be adjusted such, that the ratio of the data bit energy to background noise density and hence the transmission power requirements of the dedicated physical control channel and the dedicated physical data channel are met without wasting too much power. For example, a high data rate dedicated physical data channel has to be transmitted with a higher transmission power than the low data rate dedicated physical control channel.

According to the current 3GPP specifications the target SIR is dynamically handled by the inner loop and outer loop power control procedures. The power-offset and the static rate matching factor, however, are determined at the beginning of the transmission and are kept constant during the entire transmission.

A disadvantage is, since the above three parameters strongly depend on the ratio of bit energy to background noise density ($E_b/N_0$) on each transport channel, that for determining a certain amount of target SIR, static rate matching and power-offset it has to be assumed that the $E_b/N_0$ values are roughly constant. However, it is well known that each of the bit energy to background noise density ratios will change depending on the radio bearer service behavior, such as the service multiplexing and data rates, and the environment, such as the speed of a mobile station, interference situation and propagation conditions, for example.

SUMMARY OF THE INVENTION

It is an object of the invention to provide an improved control mechanism for the quality of services in a CDMA-System and a CDMA-System comprising an improved quality of services controlling functionality.

It is a further object of the invention to provide such an improvement in particular by providing a controlling means apt to assign the target signal to interference ratio, the static rate matching factor the power-offset dynamically, especially adapted to be used for UMTS-Systems.

The inventive solution is characterized by a method, a system, a base station, a mobile station and implementation software incorporating the features of the claims.

Accordingly, the invention proposes and uses a dynamic quality control for adjusting quality of services of a CDMA-based System transmitting a plurality of different services between the system and a user equipment by using at least one data channel with the services multiplexed and rate matching technique applied and an associated control channel wherein parameters representing transmitting properties concerning the quality of service, advantageously representing a signal to interference ratio for the control channel, a static rate matching factor for each service and a power-offset between the control channel and the data channel are derived for each service to achieve desired quality of services, during an installation process based on default quality requirements and during an operating condition dynamically in dependence of quality estimates performed on each of the services during data transmission.

According to preferred embodiments the invention proposes the use of a variety of measurements or estimates of the user behavior, in particular the bit-error-rate or block-error-rate and the data rates and of the environment, such as the speed of the user equipment or interference. Thus with the inventive approach it is able to handle variations not only on the reliability qualities (BER/BLER) on all transport channels but also differences between various transport channels dynamically resulting in a significant improvement of saving radio resources. Moreover since the invention uses radio resource control procedures that are currently defined in the 3GPP standards an easy implementation is ensured to adapt current CDMA-Systems.

According to further preferred embodiments a look-up-table for the default values in combination with an update procedure of the inventive approach is proposed resulting in a self optimizing behavior. With other words by using the inventive approach implemented within an associated radio network controller of the transceiver of CDMA-System it is enabled to adapt the parameter to unknown environments and the specific radio bearer service behavior. Moreover system units from different venders can be connected to the same radio network controller without exact knowledge of the bit energy to background noise density on each transport channel and of symbol energy to background noise density on the dedicated physical control channel since an iteration to these values is achieved by setting some predefined values and using the inventive update procedures. Consequently, the inventive approach supports multi-vender environment in a very efficient manner. Furthermore, such a look-up-table for the default values also can be reused for radio resource allocation reasons, such as for the purpose of admission control or the resource allocation.

The inventive method may be seen as a dynamic enhancement of the co-pending European patent application 99 305 516.9, Lorenz Freiberg and Jens Mückenheim: "Universal Mobile Telephone System Network with Improved Rate Matching Method", and of the co-pending European patent application 99 232 07.6, Lorenz Freiberg, Jens Mückenheim and Richard Settler: "Power Offset Assignment for the Physical Control Channel in Universal Mobile Telecommunication Systems (UMTS)" where static rate matching and power-offset assignment, respectively, is described for the static case. The contents of both co-pending European patent applications are incorporated by reference hereby.

BRIEF DESCRIPTION OF THE DRAWINGS

The invention is described in more detail below, in particular on the basis of preferred exemplary embodiments, with reference to the attached drawings, in which.

DETAILED DESCRIPTION

Figure 1:
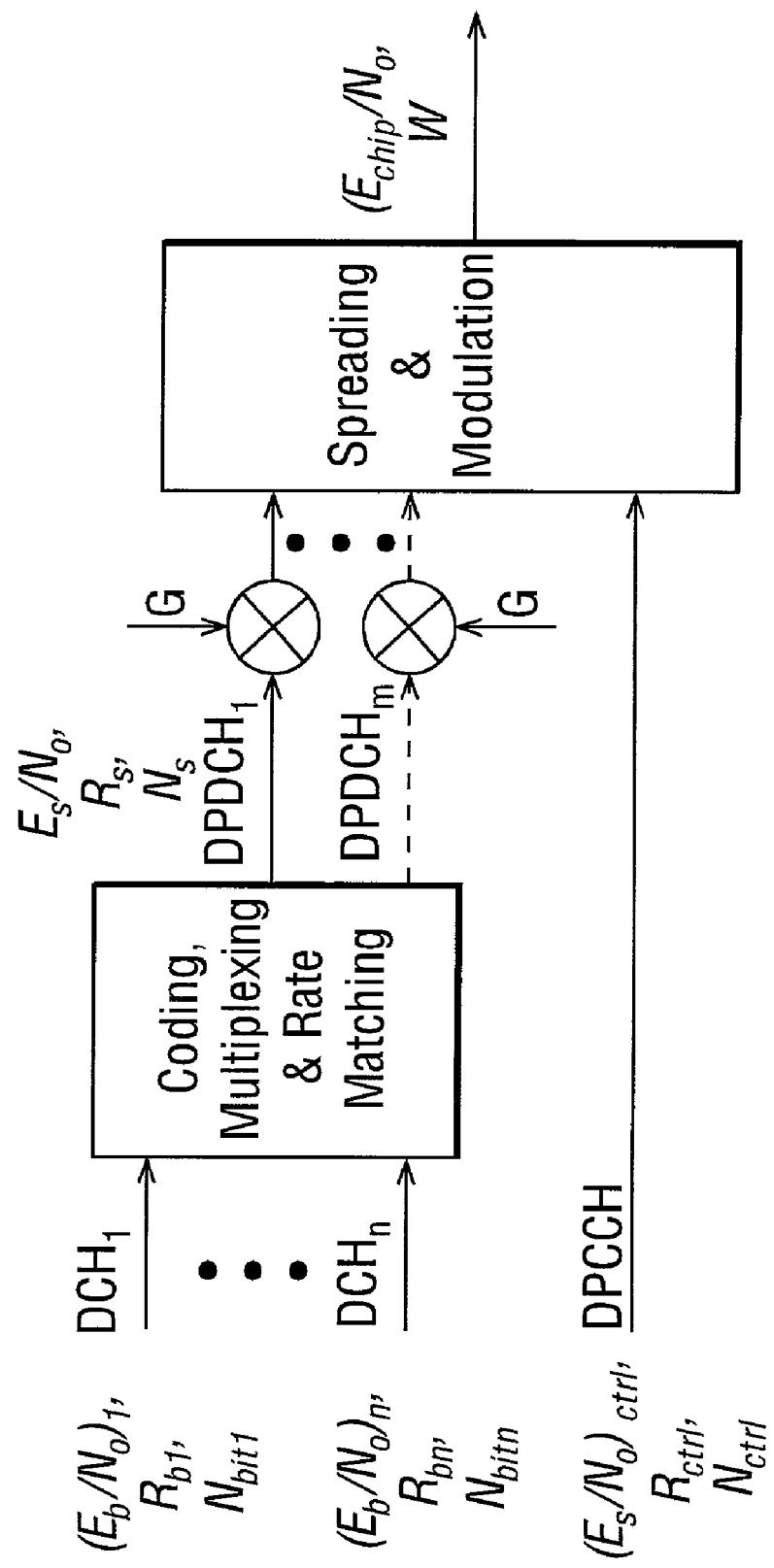
FIG. 1 schematically shows an exemplary UMTS-layer 1 model incorporated on the transmitter side of an user equipment or a core network, and FIG. 2 a preferred embodiment of the inventive quality control approach adapted to the layer 1 model of FIG. 1.

Reference firstly being made to FIG. 1 schematically depicting for exemplary reasons only an UMTS (Universal mobile telecommunication system) physical layer 1 model of the transmitter side for the up-link and for the down-link direction, i. e. a layer 1 model as located in a base transceiver station (BTS) of a radio telecommunications network for the down-link and as located in a user equipment as for example a mobile station for the up-link.

As known for a person skilled in the art, dedicated channel DCHs, each of which forming a transport channel TrCH for a certain service to be transmitted between the network and a user, are coded and multiplexed into one or several dedicated physical data channels DPDCHs. According to FIG. 1, dedicated channels $DCH_1$ to $DCH_n$, each incorporating a service as for example a video service or a voice service comprising its own quality of service requirements of one user, are coded and multiplexed into dedicated physical data channels $DPDCH_1$ to $DPDCH_m$. Additionally, a rate matching technique is applied to balance the data symbol energy to noise power density ratio ($E_s/N_0$) requirements of different dedicated channels. Then, the dedicated physical data channels are weighted by an amplitude factor G, multiplexed with an associated dedicated physical control channel DPCCH and spread to a chip rate W.

Regarding FIG. 1 in detail, wherein the number of services is "n". The property of each $DCH_i$, with $1 \leq i \leq n$, is described by $(E_b/N_0)_i$, i. e. by the data bit energy to noise power density ratio, and furthermore by the data bit rate $R_{bi}$. The number of data bits per frame is $N_{biti}$ and the current data bit rate according to the exemplary UMTS model is given by $R_{bi}=N_{biti}/10$ ms.

Furthermore, the number of multi-codes used is "m", i.e. with m>1 more than one dedicated physical data channel DPDCH is assigned to one code composite transport channel (CCTrCH). Each of the dedicated physical data channels, i. e. each $DPDCH_i$, with $1 \leq i \leq m$, has the same energy per encoded symbol to noise ratio $E_s/N_0$ and the same data symbol rate $R_s$. The number of symbols is $N_s$.

The dedicated physical control channel, i. e. DPCCH is described by the energy per control symbol to noise ratio $(E_s/N_0)_{ctrl}$ and by the control symbol rate $R_{ctrl}$. The number of control bits per frame is $N_{ctrl}=N_{pilot}+N_{TPC+NTFCI}$ (i.e. the total of pilot bits, transmission power control bits and the bits for the transport format combination indicator). With such a determination the energy per control symbol to noise ratio $(E_s/N_0)_{ctrl}$ is representing the signal to interference ratio (SIR) on the dedicated physical control channel.

The relation between $(E_b/N_0)_i$ of $DCH_i$ and $E_s/N_0$ is given by $$\left(\frac{E_b}{N_0}\right)_i \cdot N_{biti} = \left(\frac{E'_S}{N_0}\right)_i \cdot N'_{si} = \frac{E_S}{N_0} \cdot N_{si}, \qquad \text{equation 1}$$

wherein $(E'_s/N_0)_i$ is the energy per data symbol to noise ratio of DCH #i without a rate matching applied, and $N'_{si}$ is the number of data symbols without rate matching applied.

The relation between $N_{si}$ and $N'_{si}$ is determined by the rate matching factor $RF_i$:

$$N_{si} = N'_{si} RF_i = N'_{si} DRF\, SRF_i. \quad \text{equation 2}$$

Depending on the rate matching factor $RF_i$ there are three possibilities. Rate matching is achieved by repetition of the data symbols (i. e. $RF_i \leq 1$) or by puncturing of the data symbols (i. e. $RF_i < 1$) or no rate matching is applied (i. e. $RF_i = 1$). The rate matching factor $RF_i$ is given by the product of a dynamic rate matching factor DRF which is equal for all multiplexed services of one service combination and a specific static rate matching factor $SRF_i$ for service #i. The number of data symbols $N_s$ for one DPDCH is calculated by the sum of all $N_{si}$ divided by the number of multi-codes used, i. e. by m according to $$N_S = \frac{1}{m} \sum_{i=1}^{n} N_{si}. \quad \text{equation 3}$$

The choice of the dynamic rate matching factor DRF and the static rate matching factor $SRF_1$ for service #i depends on the following constraints:

a) For all DCHs of one service combination the $E_s/N_0$ should nearly be the same (i. e. "$E_s/N_0$-balancing") instead of having different $E'_s/N_0$ without rate matching. This constraint can be fulfilled by adjusting the static rate matching factor $SRF_i$, whereby from equations 1 and 2 follows, that $SRF_j$ depends on the service requirement on the DCH for service #i but not on the current service combination.

b) In the uplink, the number of symbols $N_s$ should be equal to the maximal number of symbols of the code composite transport channel, i. e. $N_s = N_{slimit}(UL)$, since discontinuous transmission cannot be used. This is done by adjusting the dynamic rate matching factor DRF. In the uplink a variable spreading factor is used and hence $N_{slimit}$ is variable. Based on equations 2 and 3 it follows, that the DRF is the same for all multiplexed services of a certain service combination and varies by changing this combination, for example by changing the data rate.

c) In the downlink it has to be $N_s \leq N_{slimit}(DL)$. There is only one fixed spreading factor SF allocated for the highest data symbol rates and hence $N_{slimit}$ is constant. In the downlink the dynamic rate factor is used to ensure that for the transport format combination with the maximum data rate: $N_s = N_{slimit}(DL)$. Hence the dynamic rate factor is constant, i.e DRF=constant.

Concerning a method for determining the rate matching factor reference is made to the aforementioned European patent application 99 305 516.9, the contents of which is incorporated herein. According to that disclosure the rate matching factor could be derived, for example, by determining for each service the energy per bit per noise density $E_b/N_0$ required to achieve a desired bit error rate, deriving therefrom a value of the energy per coded symbol per noise density $E_s/N_0$ and based thereon deriving a rate matching factor by which that $E_s/N_0$ can be matched to the minimum energy per coded symbol per noise density applicable to the channel in which the services are multiplexed.

Regarding next the weighting factor G, i. e. representing the power-offset between the dedicated physical data channel and the dedicated physical control channel.

In the uplink the DPCCH is code-multiplexed to the DPDCH. Thus, the relation between $(E_s/N_0)_{ctrl}$ of the DPCCH and $E_s/N_0$ of one DPDCH in the uplink is given by $$\frac{E_S}{N_0} \cdot N_S = \left(\frac{E_S}{N_0}\right)_{ctrl} \cdot N_{ctrl} \cdot G^2. \quad \text{equation 4}$$

If there is no data to send on DPDCH it is switched of and hence: G=0.

The downlink uses time-multiplexing between DPDCH & DPCCH. Hence, the relation between $(E_s/N_0)_{ctrl}$ of the DPCCH and $E_s/N_0$ of one DPDCH in the downlink is given by $$\frac{E_S}{N_0} = \left(\frac{E_S}{N_0}\right)_{ctrl} \cdot G^2. \quad \text{equation 5}$$

The power-offset G has to be adjusted in order to fulfil the following constraints:

a) In the uplink: The $(E_s/N_0)_{ctrl}$ has to be kept nearly constant regardless what service combination is currently used. From equations 1 to 4 follows that there are different G factors for different service combinations.

b) In the downlink: The $(E_s/N_0)$ has to be kept at a certain value. Since the dynamic rate matching factor is constant (DRF=constant) there is only one single value of G for all service combinations (cf.equations 1 to 3 and 5).

A method for determining the power-offsets for each transport format combination set (TFCS) is presented for example in the aforementioned European patent application 99 232 07.6 the contents of which is incorporated herein. According to that disclosure the value G is determined in the uplink:

$$G^2(l) \geq \frac{\sum_{i=1}^{n(l)} (E_b/N_0)_i \cdot N_{biti}(l)}{N_{ctrl} \cdot (E_b/N_0)_{ctrl} \cdot m(l)}, \quad \text{equation 6}$$

and in the downlink:

$$G^2(l) \geq \frac{\sum_{i=1}^{n(l)} (E_b/N_0)_i \cdot N_{biti}(l)}{N_S(l) \cdot (E_b/N_0)_{ctrl} \cdot m(l)} \quad \text{equation 7}$$

Subsequently, based on the assumptions, a dynamic quality control approach according to the invention is exemplary described mainly for the uplink and with reference to FIG. 2. In addition, for the following description it is assumed that a radio resource control (RRC) connection between a user equipment (UE), as for example a mobile station and a UMTS radio access network (UTRAN) is always established and the radio resource allocation (RRA) has admitted the resources for requested radio bearer (RB). Based thereon, an initialization for the inventive approach of a dynamic quality control approach may be describe as follows:

When there is the request to establish or release at least one radio bearer, a control means 1 for quality control function takes default $E_b/N_0$-values and default data rates $R_b$ for each transport format combination set TFCS that is assigned by the radio resource allocation (RRA) from a default table 2. The $(E_s/N_0)_{ctrl}$-value for the DPCCH depends on the requirements of channel estimations on pilot symbols, detection of power control commands, decoding of transport format combination indicator (TFCI)-bits etc. It is taken from the default table 2, too.

The choice of the values depends on measurements 3 of the current environment, such as the speed of the user equipment, the interference situation, the propagation conditions and on the combination of the services that is given by the TFCS for example. Based on these values initial parameters are determined as follows:

An initial target signal to interference ratio SIR on the DPCCH is given by the $(E_s/N_0)_{ctrl}$-value from the default table 2.

An initial static rate matching parameter SRF for each of the transport channels TrCH can be calculated by an appropriate method, preferably by the method proposed in the European patent application 99 305 516.9.

Initial power-offsets also can be determined by using an appropriate method, usefully by using the method as proposed in the European patent application 99 232 07.6.

After the determination of the initial parameters by the quality control function means 1, the static rate matching parameters, the power-offsets and the target SIR are handed to the physical layer 4 during the establishment procedure of the radio bearer. The rate matching and the power offsets can be handled by the physical layer 4 autonomously as described for example in the referenced European patent applications. The target SIR is handled by the inner loop power control.

Figure 2:
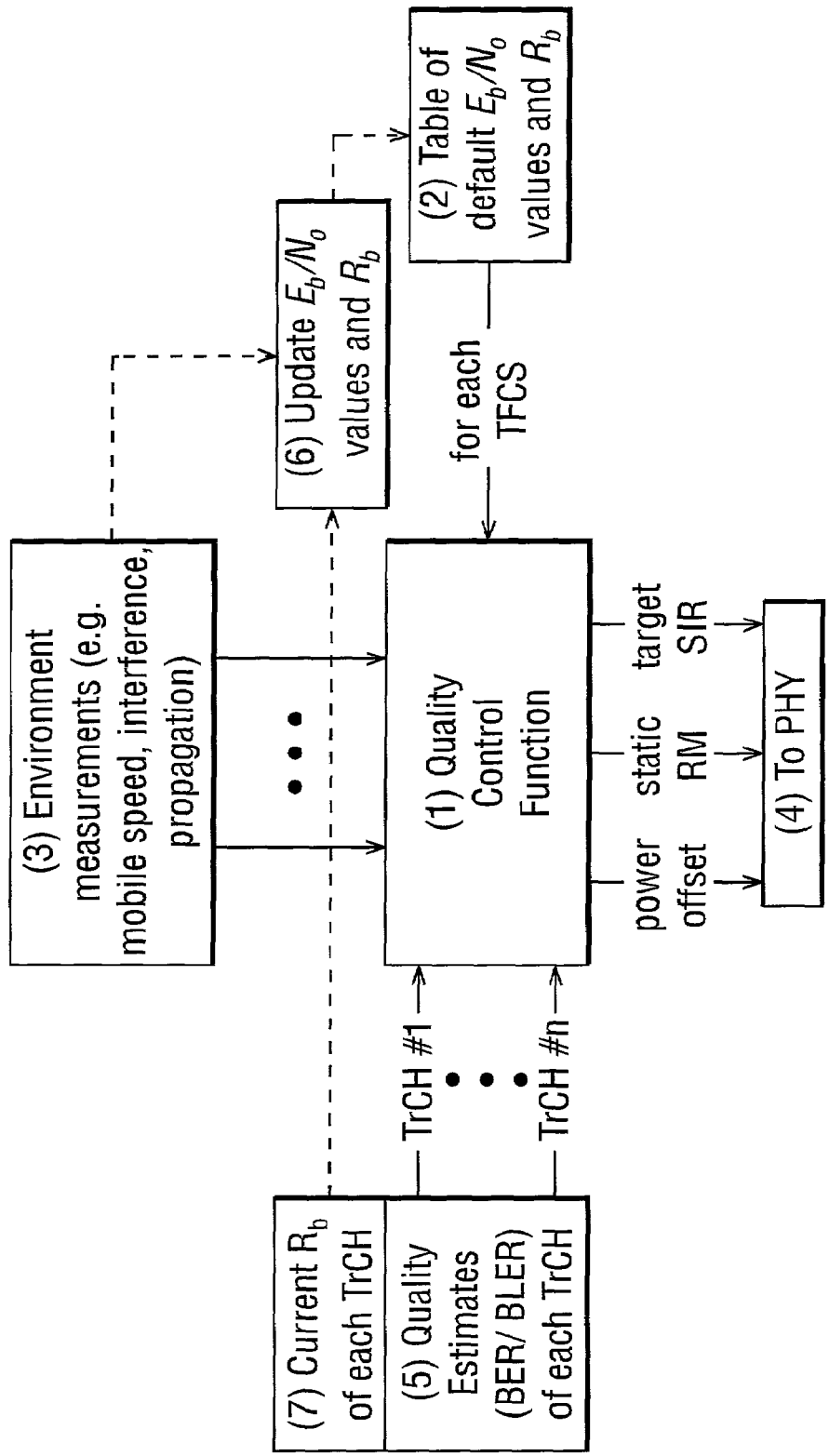

After the initialization and hence during the working period, i. e. when all radio bearer are established, the quality control function means 1 gets quality estimates of each transport channel TrCH for a service #i separately as referenced by reference sign 5 in FIG. 2. The bit-error-rate BER of each transport channel TrCH after decoding as well as the block-error-rate BLER (for example by using a simple cyclic redundancy check (CRC)) can be used as quality estimate. Due to its significance, the bit-error-rate BER after decoding may be preferred.

A preferred dynamic handling of the three parameters may be performed as follows:

The target SIR is handled by the conventional outer loop power control function. With other words, if the bit-error-rate or the block-error-rate of all transport channels are better than a definable threshold, the target SIR will be decreased. If the bit-error-rate or block-error-rate of at least one transport channel is worse than a definable threshold, the target SIR will be increased. The thresholds for increasing or decreasing of the target SIR depend on the radio bearer service behavior. The amount of increasing or decreasing is determined based on the measurements 3 of the current environment.

It should be noted, that if the bit-error-rate or block-error-rate of one transport channel is significantly worse than the threshold, the static rate matching parameter will be adjusted. However, since the static rate matching parameters is never set perfectly the SIR target will always have to respond to a misalignment in the bit-error-rate or block-error-rate targets.

A preferred handling of the power-offsets is as follows: If the target SIR reaches a upper limit, the power offsets between DPCCH and DPDCH are increased by the same amount for all transport format combination sets TFCS. If the target SIR reaches an lower limit, the power offsets are decreased accordingly. The upper and lower limits of the target SIR depend for example on the initial target SIR and the amount of increasing or decreasing is determined regarding the environment measurements 3.

For handling the static rate matching parameters it is preferred that a static rate matching parameter will be recalculated if the bit-error-rate or block-error-rate of at least one transport channel is better than a threshold whereas the bit-error-rate or block-error-rate of all other transport channels are within its limits. The thresholds or limits for the bit-error-rate or block-error-rate of each transport channel can be the same as for a conventional outer loop power control.

After the determinations, the target SIR is signaled to the physical layer 4 via conventional outer loop power control signaling, for example by a framing protocol. The new power offsets and rate matching factors can be signaled to the physical layer 4 using the transport channel reconfiguration procedure according to the 3GPP standards. To keep the signaling overhead small a transport channel reconfiguration should be processed only in intervals of a few seconds.

Furthermore, according to very preferred embodiments of the invention, the quality control function means 1 should regularly monitor the current $E_b/N_0$ values on each transport channel and the $E_s/N_0$ on the DPCCH for an optimization of the default table 2 containing the defaults $E_b/N_0$ and $R_b$ on TrCH and $E_s/N_0$ on DPCCH. The current values can be determined from the target SIR, power offset and rate matching, as it is obvious for a person skilled in the art.

Although a cell is configured for a certain target environment there are really an infinite number of possible environments within a cell. Therefore, it is proposed that the default table 2 recognizes this range in environments and is set for an average case. Furthermore, in some cases the default table 2 can be improved to contain different average values for different sub-sets with the complete range of possible environments. Nevertheless, the average case is chosen such that all final parameters can be reached efficiently and no particular parameters are favored. Therefore, the default values should only be changed if the average value needs to be updated. An update function device 6 stores the current $E_b/N_0$ values in the default table 2 of the default $E_b/N_0$ together with the current mix of data rates $R_b$ of each transport channel, as depicted by reference sign 7 of FIG. 2, and the current environment measurements 3. Accordingly, this procedure helps to find more accurate $E_b/N_0$, values for certain service mix and environments.

Even the dynamic quality control approach according to the invention is described mainly for the uplink it is obvious for persons skilled in the art that it can be also applied for the downlink direction.

Summarizing the above a method or implementation according to the invention has the following properties with regard to the prior art:

While a conventional outer loop power control controls only the target SIR on the DPCCH the inventive quality controlling approach additionally adjusts the power offset between the DPCCH & DPDCH and the static rate matching attribute, dynamically. Furthermore, the proposed inventive method using a variety of measurements of the user behavior and of the (current) environment is able to handle variations not only on the quality, i. e. the bit-error-rate or the block-error-rate, on all transport channels but also differences between various transport channels and hence is saving radio resources. Since the inventive method uses radio resource control procedures that are currently defined in the 3GPP standards, especially the outer loop power control and transport channel reconfiguration procedures, an implementation of the inventive method is significantly simplified. Moreover by using a table for the default values in combination with the update procedure the inventive method has a self optimizing behavior, i. e. by use of the inventive approach, a radio network controller incorporating the implemented inventive method is able to adapt its parameter set to unknown environment and radio bearer service behavior. Furthermore, Node Bs from different vendors can be connected to the same radio network controller without exact knowledge of the $E_b/N_0$ on each transport channel and of the $E_s/N_0$ in DPCCH since an iteration to these values can be achieved by setting some pre-defined values and using the update procedure. Hence the inventive approach supports a multi-vendor environment in an efficient manner. Moreover, the default value table 2 also can be re-used by the radio resource allocation, such as for the purpose of admission control and resource allocation for example.

Finally it should be noted that the invention is described mainly with regard to a UMTS-system. However, the invention also may be applied within other systems based on CDMA technology.

The invention claimed is:

1. Method of controlling quality of service of a CDMA-based system, especially of a CDMA-based telecommunication network, transmitting a plurality of different services between the system and a user equipment by using at least one data channel (DPDCH) with the services multiplexed and rate matching technique applied and an associated control channel, comprising (DPCCH) the step of:

deriving for the services to be transmitted and for the control channel default quality requirements necessary to achieve desired quality of services, based on the default quality requirements determining of a plurality of initial parameters representing transmitting properties concerning the quality of service, dynamically adjusting each of said initial parameters in dependence of quality estimates (BER/BLER) performed during data transmission on each of said services, wherein the step of deriving default quality requirements comprises the choosing of an Energy per Bit per Noise density ratio ($E_b/N_0$) and a Data Rate ($R_b$) for each service to be transmitted and a Energy per Symbol per Noise density ratio (($E_s/N_0)_{ctrl}$) for the control channel (DPCCH) from a look up table (2) in dependence on environments measurements (3) and on the combination of the services to be transmitted.

2. Method of claim 1, wherein the parameters representing transmitting properties concerning the quality of service comprise a static rate matching factor (SRF) for each service, a signal to interference ratio (SIR) for the control channel (DPCCH) and a power-offset (G) between the control channel (DPCCH) and the at least one data channel (DPDCH).

3. Method of claim 1, wherein the environments measurements (3) includes the speed of the user equipment, interference situation and/or propagation conditions.

4. Method of claim 1, comprising the step of handing the initial and/or adjusted parameters to a physical layer within pre-definable time intervals.

5. Method of claim 1, wherein the step of dynamically adjusting is performed by using actual bit-error-rates (BER) of each transport channel (TrCH) after decoding and/or block-error-rates (BLER) related to a single service, respectively.

6. Method of claim 1, wherein the step of dynamically adjusting comprises the adjustment of the signal to interference ratio (SIR) for the control channel (DPCCH) by use of an outer loop power control in response to a comparison of the quality estimates (BER/BLER) with pre-definable thresholds.

7. Method of claim 6, wherein the step of dynamically adjusting comprises the recalculation of a power offset (G) between the control channel (DPCCH) and the at least one data channel (DPDCH) in response to a comparison of the signal to interference ratio (SIR) with a further pre-definable threshold.

8. Method of claim 1, wherein the method is performed within a UMTS-System.

9. Method of claim 1, wherein the at least one data channel and the control channel is provided by a dedicated physical data channel (DPDCH) and a dedicated physical control channel (DPCCH), respectively.

10. Method of controlling quality of service of a CDMA-based system, especially of a CDMA-based telecommunication network, transmitting a plurality of different services between the system and a user equipment by using at least one data channel (DPDCH) with the services multiplexed and rate matching technique applied and an associated control channel, comprising (DPCCH) the step of:

deriving for the services to be transmitted and for the control channel default quality requirements necessary to achieve desired quality of services, based on the default quality requirements determining of a plurality of initial parameters representing transmitting properties concerning the quality of service, dynamically adjusting each of said initial parameters in dependence of quality estimates (BER/BLER) performed during data transmission on each of said services, wherein the step of determining the initial parameters comprises the determining of a static rate matching factor (SRF) for each service, a signal to interference ratio (SIR) for the control channel (DPCCH) and a power-offset between (G) the control channel (DPCCH) and the at least one data channel (DPDCH) is performed by using conventional calculating methods.

11. Method of controlling quality of service of a CDMA-based system, especially of a CDMA-based telecommunication network, transmitting a plurality of different services between the system and a user equipment by using at least one data channel (DPDCH) with the services multiplexed and rate matching technique applied and an associated control channel, comprising (DPCCH) the step of:

deriving for the services to be transmitted and for the control channel default quality requirements necessary to achieve desired quality of services, based on the default quality requirements determining of a plurality of initial parameters representing transmitting properties concerning the quality of service, dynamically adjusting each of said initial parameters in dependence of quality estimates (BER/BLER) performed during data transmission on each of said services, wherein the step of dynamically adjusting comprises the recalculation of a static rate matching factor (SRF) for each service in response to a comparison of the quality estimates (BER/BLER) with pre-definable thresholds.

12. Method of claim 11, wherein the step of dynamically adjusting comprises the adjustment of the signal to interference ratio (SIR) for the control channel (DPCCH) by use of an outer loop power control in response to a comparison of the quality estimates (BER/BLER) with pre-definable thresholds.

13. Method of claim 12, wherein the step of dynamically adjusting comprises the recalculation of a power offset (G) between the control channel (DPCCH) and the at least one data channel (DPDCH) in response to a comparison of the signal to interference ratio (SIR) with a further pre-definable threshold.

14. Method of claim 11, wherein the default quality requirements are updated by means of monitoring actual Energy per Bit per Noise density ratios ($E_b/N_0$), Data Rates ($R_b$) and Energy per Symbol per Noise density ratios (($E_S/N_0)_{ctrl}$) with regard to environments measures and/or user behavior related thereto.

15. Method of claim 11, wherein the step of deriving default quality requirements comprises the choosing of an Energy per Bit per Noise density ratio ($E_b/N_0$) and a Data Rate ($R_b$) for each service to be transmitted and a Energy per Symbol per Noise density ratio (($E_S/N_0)_{ctrl}$) for the control channel (DPCCH) from a look up table (2) in dependence on environments measurements (3) and on the combination of the services to be transmitted.

16. Method of controlling quality of service of a CDMA-based system, especially of a CDMA-based telecommunication network, transmitting a plurality of different services between the system and a user equipment by using at least one data channel (DPDCH) with the services multiplexed and rate matching technique applied and an associated control channel, comprising (DPCCH) the step of:
    deriving for the services to be transmitted and for the control channel default quality requirements necessary to achieve desired quality of services,
    based on the default quality requirements determining of a plurality of initial parameters representing transmitting properties concerning the quality of service,
    dynamically adjusting each of said initial parameters in dependence of quality estimates (BER/BLER) performed during data transmission on each of said services,
    wherein the default quality requirements are updated by means of monitoring actual Energy per Bit per Noise density ratios ($E_b/N_0$), Data Rates ($R_b$) and Energy per Symbol per Noise density ratios (($E_S/N_0)_{ctrl}$) with regard to environments measures and/or user behavior related thereto.

17. CDMA-based system, especially a mobile telecommunication system, adapted for transmitting a plurality of different services between the system and a user equipment by using at least one data channel (DPDCH) with the services multiplexed and rate matching technique applied and an associated control channel (DPCCH), comprising
    means for providing default quality requirements necessary to achieve a desired quality of service with regard to the services to be transmitted and to the control channel,
    means for performing quality estimates during data transmission on each of said services, and
    means for determining parameters based either on the default quality requirements or on the quality estimates representing a static rate matching factor (SRF) for each service, a signal to interference ratio (SIR) for the control channel (DPCCH) and a power-offset (G) between the control channel (DPCCH) and the at least one data channel (DPDCH), wherein the means for performing quality estimates uses actual bit-error-rates (BER) of each transport channel (TrCH) after decoding and/or block-error-rates (BLER) related to a single service, respectively, and
    wherein the means for determining comprises means for comparing the quality estimates (BER/BLER) with at least one pre-definable threshold for recalculation of the static rate matching factor (SRF) for the adjustment of the signal to interference ratio (SIR) and for comparing the signal to interference ratio (SIR) with a further pre-definable threshold for the recalculation of a power offset (G).

18. CDMA-based system of claim 17, wherein the means for providing default requirements comprises means for updating said default requirements by using means for monitoring actual Energy per Bit per Noise density ratios ($E_b/N_0$), Data Rates ($R_b$) and Energy per Symbol per Noise density ratios (($E_S/N_0)_{ctrl}$) and/or means for measuring actual environments and/or user behavior.

19. CDMA-based system of claim 17, characterized by means for handing the parameters to a physical layer within pre-definable time intervals.

* * * * *